US011425026B2

(12) United States Patent
Dutta et al.

(10) Patent No.: US 11,425,026 B2
(45) Date of Patent: Aug. 23, 2022

(54) TRANSFER OF SECURE MULTICAST DATA TRAFFIC OVER A COMPUTING NETWORK

(71) Applicant: HEWLETT PACKARD ENTERPRISE DEVELOPMENT LP, Houston, TX (US)

(72) Inventors: Manoj Kumar Dutta, Dublin, CA (US); Edward Paul Travalia, Battle Ground, WA (US); Gopinath Sikha, Sunnyvale, CA (US); Manoj Gopal Kulkarni, Fremont, CA (US); Damon John Ennis, San Jose, CA (US); Pawan Kumar Singh, Los Altos, CA (US); Theodore Ernest Tedijanto, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/852,047

(22) Filed: Apr. 17, 2020

(65) Prior Publication Data

US 2021/0328909 A1   Oct. 21, 2021

(51) Int. Cl.
| | |
|---|---|
| *H04L 45/16* | (2022.01) |
| *H04L 12/18* | (2006.01) |
| *H04L 12/46* | (2006.01) |
| *H04L 45/18* | (2022.01) |
| *H04L 45/48* | (2022.01) |

(52) U.S. Cl.
CPC ............ *H04L 45/16* (2013.01); *H04L 12/185* (2013.01); *H04L 12/4641* (2013.01); *H04L 45/48* (2013.01)

(58) Field of Classification Search
CPC ...... H04L 45/16; H04L 45/48; H04L 12/4641; H04L 12/185
See application file for complete search history.

(56) References Cited

U.S. PATENT DOCUMENTS

| 8,645,576 B2 | 2/2014 | Farinacci et al. |
| 10,333,828 B2 | 6/2019 | Bacthu et al. |
| 2016/0006646 A1* | 1/2016 | Lin ..................... H04L 12/6418 370/390 |
| 2019/0207779 A1* | 7/2019 | Immidi ................. H04L 12/185 |
| 2019/0296922 A1 | 9/2019 | Dutta |

FOREIGN PATENT DOCUMENTS

EP   2930881 A1   10/2015

OTHER PUBLICATIONS

Extended European Search Report Received for EP Patent Application No. 21154202.2, dated Jun. 21, 2021, 9 pages.

* cited by examiner

*Primary Examiner* — Jianye Wu

(57) ABSTRACT

Disclosed herein are systems and methods for scalable and secure transmission of multicast data over a public communication network. In exemplary embodiments of the present disclosure, a virtual overlay network can be presented as a single virtual interface to a computing device, for the receipt and transfer of multicast data in a secure and scalable manner across a public insecure communication network.

20 Claims, 5 Drawing Sheets

TRANSFER OF SECURE MULTICAST DATA TRAFFIC OVER A COMPUTING NETWORK

CROSS-REFERENCE TO RELATED APPLICATIONS

N/A

TECHNICAL FIELD

This disclosure relates generally to the secure and scalable transfer of multicast data over a computing network via a virtual overlay network.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Certain computing appliances can be utilized to enable an enterprise's SD-WAN (software defined wide area networking) deployment, allowing for zero-touch provisioning, enhanced quality of service, security, and redundancy over any type of network, including basic (public) Internet. In the enterprise, customers have historically leased lines from network providers (MPLS is an example of a type of leased line). This means that the provider provisions and configures the network from end-to-end, and the user pays a high price in order to have what is essentially a private network. This also puts them at the mercy of the provider during outages, and gives them little recourse when the provided service is misbehaving, or requires changes to configuration.

Providing systems and methods to free an enterprise from these limitations of MPLS, and expressly enabling enterprise computers to use basic Internet or other methods of communicating between their offices, provides the enterprise with a low-cost alternative to MPLS, or redundancy alongside MPLS. Further, a computing appliance can also function in certain deployments as a replacement for a typical edge-router, by providing the same support for all protocols and applications across any network. In this way, an end-user customer would have to make no special accommodations, and would not need to know nor care whether the underlying traffic was running over MPLS or Internet or other type of network.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In various embodiments of the present disclosure, a method for transmitting multicast data over a public communication network by a first network appliance is disclosed. The method may comprise: receiving at the first network appliance, designated as a rendezvous point for a multicast data transmission, a request from a second network appliance to receive the multicast data transmission; transmitting the multicast data transmission from a transmitting computing device to a virtual interface of the first network appliance; encapsulating the multicast data transmission by the first network appliance into a virtual network overlay transmission; transmitting the virtual network overlay transmission from the first network appliance over the public communication network to the second network appliance; and transmitting the multicast data transmission by the second network appliance to a receiving computing device.

Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

DETAILED DESCRIPTION

Figure 1:
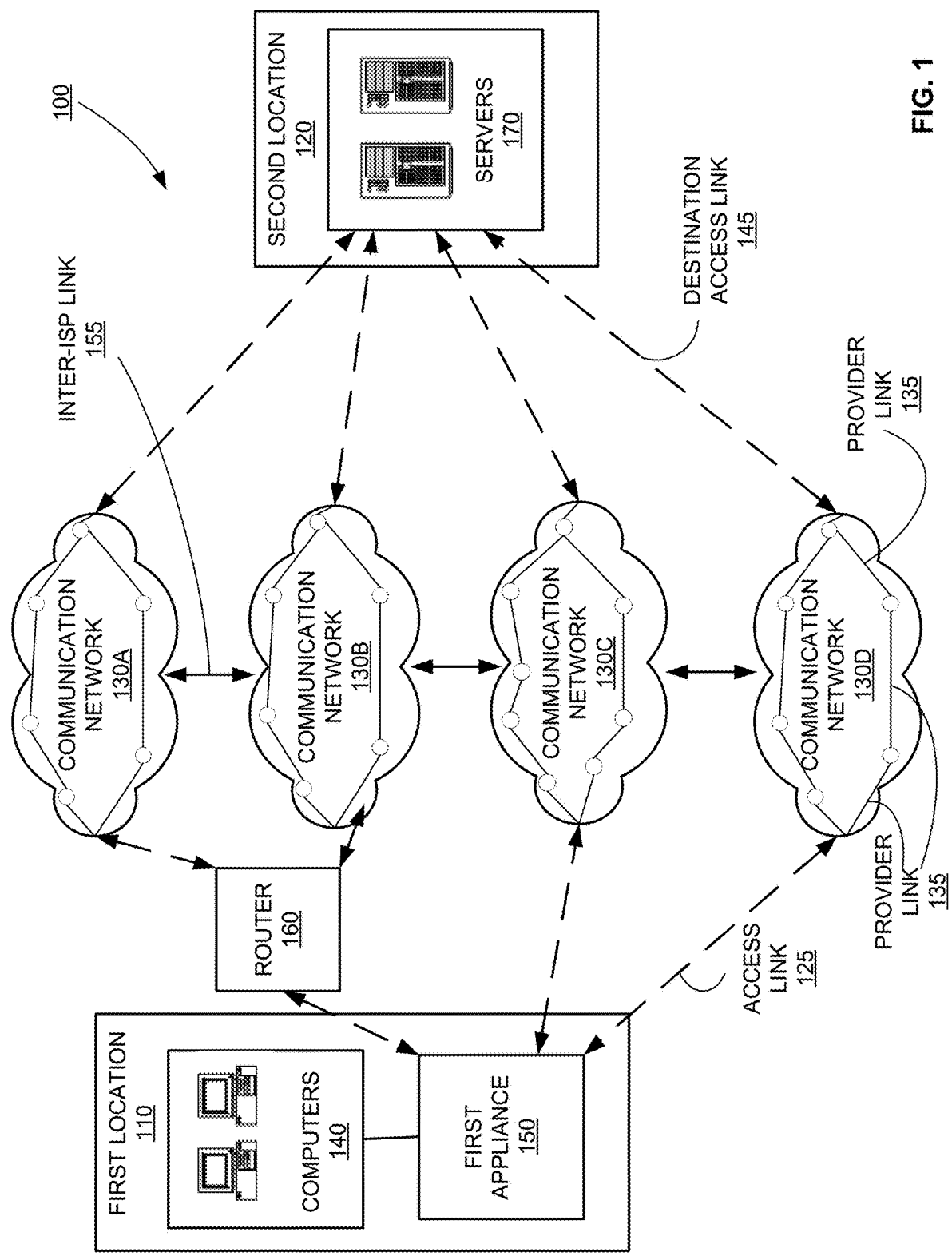
FIG. 1 illustrates an exemplary system within which the present disclosure can be implemented.

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to mechanisms for extending multicast network data traffic over a public WAN in a secure manner.

As known to persons of ordinary skill in the art of computer networking, multicast is a group communication method whereby data transmission is addressed to a group of destination computers simultaneously. Group communication may either be application layer multicast or network assisted multicast, where the latter makes it possible for the source to efficiently send to the group in a single transmission. Copies are automatically created in network elements, such as routers, switches and cellular network base stations, but only to network segments that currently contain members of the group.

Network assisted multicast may be implemented at the data link layer using one-to-many addressing and switching such as Ethernet multicast addressing, Asynchronous Transfer Mode (ATM), point-to-multipoint virtual circuits (P2MP) or Infiniband multicast. Network assisted multicast may also be implemented at the Internet layer using IP multicast. In IP multicast the implementation of the multicast concept occurs at the IP routing level, where routers create optimal distribution paths for datagrams sent to a multicast destination address. Further, multicast is often employed in Internet Protocol (IP) applications of streaming media, such as IPTV and multipoint videoconferencing.

Embodiments of the present disclosure may be implemented via Multicast IPv4 protocol as defined by RFC5110, RFC5771, RFC1112 and others. Multicast is a routing architecture, allowing for the efficient distribution of traffic broadcasted from a source to multiple destinations. The use of multicast IP is widespread but limited due to its implementation. Its salient limitation is that the routing protocols that govern it—most notably PIM—must be configured and run upon all intermediate routers within the network from endpoint to endpoint. Thus, it is useful today only in private networks where these routers may be provisioned and maintained—and therefore wouldn't be used upon the internet itself. In other words, a videoconferencing application used within a company such that all employees could join would be a good example of an application that would use multicast, whereas streaming a movie from a website would not. In the former case, the customer must request that multicast be enabled on their network, and an IT employee for the MPLS provider must manually configure PIM-SM on all of the routers on the network. If a new branch office router is added, it must also be manually configured.

The details about multicast's operation can be found in the RFC and other associated documents. Briefly, it consists of a source that doesn't 'broadcast' but instead 'multicasts' its packets to the network. The clients that wish to receive these packets, request to do so by querying the source's unicast address. 'Broadcast' would imply that the source would send packets that all of the hosts on the network would receive. A less efficient method that perhaps had 'sessions' for each source-client pair (as you would with an SSH or HTTP connection) would make it so that the source would send out a copy of each packet of data (such as each frame of video, for example) to each and every one of its recipients. In such a case, if many people wanted to view this particular video feed, the source and the network closest to the source would be overwhelmed with traffic, causing congestion and drops and lower quality of service for each of the recipients. That is, the video streaming quality would be sub-optimal.

Instead, Multicast makes it so that each router along the chain knows which interfaces from which they receive (IIF, incoming interface) and need to send (OIF, outgoing interface) a packet. In this fashion, all of the routers participating in the Multicast routing protocol make it so that the source sends only one packet and that packet is never duplicated until it reaches a router upon which there are two downstream OIFs with ultimately recipient clients downstream from these two interfaces. Multicast Group (destination) addresses are identified by a special IP range 224.0.0.0-239.255.255.255.

Protocol Independent Multicast (PIM)—Sparse Mode (SM) is a multicast routing protocol that allows routers to communicate information about what sources and clients desiring to see the sources live on the network in relation to the router's interfaces.

In embodiments of the present disclosure, a single router is typically designated through configuration as an RP (Rendezvous Point). This router acts as a central figure in the network. When a source has media to broadcast (e.g., a video feed) it registers by sending a message to its nexthop router. If configured with PIM, this router will make note that it has a source from one of its interfaces (upstream IIF) and will send the control packet on towards the RP on its OIF. In this fashion, it will continue onward throughout all of the routers in the network until it reaches the RP and builds the 'trunk' of a tree pointing back to the root of the source traffic. As clients wish to attach to this feed from the source, each client sends a unicast packet request that is destined to the source. Routers participating in PIM will take these 'Join' messages and build branches of the tree back in the other direction from the client to the RP. In this fashion, a tree of paths is built that show where a single packet can traverse to get from source to client. A single packet can travel along this path until it hits a router that has built multiple OIFs—such that the packet must be duplicated and sent out of its multiple paths (on smaller branches). In this fashion, multicast is very efficient—only duplicating packets when absolutely necessary and limiting congestion in the network.

Typically this PIM-SM protocol 'tree' can only work on a private network managed by a service provider, and not over the broader Internet. That is because the Internet has a great many routers that are out of the control of any one enterprise and the enterprise's network provider. As such, none of these routers are explicitly configured to support PIM and therefore unable to carry multicast traffic.

Embodiments of the present disclosure describe special purpose computing appliances that can operate a customized version of PIM-SM to make an entire proprietary SD-WAN fabric appear as a single neighboring router. It consists of a generic protocol portion provided by third party metaswitch to provide basic PIM-SM protocol compliance, and a proprietary portion discussed herein. With the proprietary systems and methods discussed herein, a multicast adjacency table is maintained, multicast packets can be processed, and the computing appliances can keep their own routing infrastructure to allow multicast all of the benefits currently available to unicast traffic—including leveraging of customized overlays, IPSec security, redundancy features, quality-of-service, FEC/POC, network-memory, etc.

Another component, PIM-lite, 'fools' neighboring PIM routers and the PIM-SM protocol to believe that an embodiment of the presently disclosed appliance is a neighboring PIM router, and that other remote appliances are neighboring PIM routers, when in fact there may be many, many routers and hops in between these appliances.

I. System Setup

FIG. 1 illustrates an exemplary system 100, within which the present disclosure can be implemented. The exemplary system 100 includes a first location 110, a second location 120, and communication networks 130A-130D. While four communication networks are depicted in exemplary system 100, there can be any number of communication networks, including just one. Additionally, system 100 can include many locations, though only two are depicted in the exemplary figure for simplicity.

In the exemplary embodiment depicted in FIG. 1, the first location 110 includes computers 140 and a first appliance 150. In the first location 110, the computers 140 are linked to the first appliance 150. While only one appliance is depicted in first location 110, there can be multiple appliances, physical and/or virtual, at first location 110. In some embodiments, the first location is a branch location of an enterprise. While not depicted here, first location 110 can also comprise additional elements such as routers, switches, or any other physical or virtual computing equipment.

Computers 140 may be any type of computing device capable of accessing a communication network, such as a desktop computer, laptop computer, server, mobile phone, tablet, or any other "smart" device configurable for connection to a communication network.

The first appliance 150 comprises hardware and/or software elements configured to receive data and optionally perform any type of processing before transmitting data across one or more communication networks.

As illustrated, the first appliance 150 is configured in-line (or serially) between the computers 140 and the router 160. The first appliance 150 intercepts network traffic between the computers 140 and the servers 170, in either direction.

In other embodiments, the first appliance 150 can be configured as an additional router, gateway, bridge, or be transparent on some or all interfaces. As a router, for example, the first appliance 150 appears to the computers 140 as an extra hop before the router 160. In some embodiments, the first appliance 150 provides redundant routing or peer routing with the router 160. Additionally, the first appliance 150 may provide failure mechanisms, such as, fail-to-open (e.g., no data access) or fail-to-wire (e.g., a direct connection to the router 160). If an appliance has multiple interfaces, it can be transparent on some interfaces, or act like a router, or act like a bridge on others. Alternatively, the appliance can be transparent on all interfaces, or appear as a router or bridge on all interfaces.

In FIG. 1, the first appliance 150 is linked to a router 160, which is coupled to communication networks 130A and 130B. While only one router 160 is depicted in exemplary system 100, there can be multiple routers, switches, or other equipment (physical or virtual) present in system 100, either within the first location 110 or outside of the first location 110. Typically, router 160 would be located within first location 110. In various embodiments, first appliance 150 may be in communication with communication networks 130C and 130D directly (on separate interfaces), instead of through router 160. While router 160 is depicted as being connected to two communication networks and first appliance 150 is also depicted as being connected to two communication networks, a person of ordinary skill in the art would understand that there can be any number of communication networks (including just one communication network) connected to the first location 110, either via router 160, via first appliance 150, or via another computing device. To illustrate that each of the access links is possible but not required in every embodiment, the access links 125 are shown as dashed lines in FIG. 1.

The second location 120 in exemplary system 100 includes servers 170. While the term "server" is used herein, any type of computing device may be used in second location 120, as understood by a person of ordinary skill in the art. The server may also be a virtual machine. While not depicted in FIG. 1, second location 120 can optionally include at least one second appliance in addition to, or instead of, servers 170. Second location 120 can also include other components not depicted in FIG. 1, such as routers, switches, load-balancers or any other physical or virtual computing equipment. In some embodiments, the second location 120 is a central location or data center for an enterprise. In other embodiments, the second location 120 is a data center hosting a public web service or application.

The servers 170 are depicted in FIG. 1 as being linked to the communication networks 130A-130D via destination access links 145. In some embodiments, servers 170 may actually be in communication with one or more of the communication networks through a router, switch, second appliance, or other physical or virtual equipment. Further, while four destination access links 145 are depicted in FIG. 1, for four communication networks (130A-130D), there may actually be fewer (such as just one) or more communication networks connected to second location 120. To illustrate that each of the destination access links 145 is possible but not required in every embodiment, the destination access links 145 are shown as dashed lines in FIG. 1.

The communication networks 130A-130D comprise hardware and/or software elements that enable the exchange of information (e.g., voice, video and data) between the first location 110 and the second location 120. Some examples of the communication networks 130A-130D are a private wide-area network (WAN), the public Internet, Multiprotocol Label Switching (MPLS) network, and wireless LTE network. Typically, connections from the first location 110 to the communication networks 130A-130D (e.g., from router 160 and first appliance 150) are T1 lines (1.544 Mbps), or broadband connections such as digital subscriber lines (DSL) and cable modems. Other examples are MPLS lines, T3 lines (43.232 Mbps), OC3 (155 Mbps), OC48 (2.5 Gbps), fiber optic cables, or LTE wireless access connection. In various embodiments, each of the communication networks 130A-130D may be connected to at least one other communication network via at least one Inter-ISP link 155. For example, communication network 130A may be connected to communication network 130B, 130C, and/or 130D via one or more inter-ISP links. Data may traverse more than one communications network along a path from first location 110 to second location 120. For example, traffic may flow from the first location 110 to communication network 130A, over inter-ISP link 155 to communication network 130B, and then to the second location 120.

The router 160 and first appliance 150 are optionally connected to the communication networks 130A-130D via access links 125, sometimes also referred to herein as network access links. The communication networks 130A-130D consist of routers, switches, and other internal components that make up provider links 135. The provider links 135 are managed by the network service providers such as an Internet Service Provider (ISP). The second location 120 can be connected to communication networks 130A-130D via destination access links 145. Access links 125, provider links 135, and destination access links 145 can be combined to make various network paths along which data travels between the first location 110 and the second location 120. The exemplary embodiment of FIG. 1 depicts two paths along various provider links 135 through each communication network. However, as understood by persons of ordinary skill in the art, there can be any number of network paths across one or more communication networks.

In addition, communication networks may be in communication with one another via inter-ISP link(s) 155. For example, data traveling through communication network 130A may also travel through communication network 130C before reaching second location 120. In various embodiments, data can travel through any one or more of the communication networks 130A-130D from first location 110 to second location 120, and vice versa. Generally, an inter-ISP link connects communication networks of different internet service providers, such as a link connecting Verizon LTE wireless network with Comcast broadband network. In some embodiments, an inter-ISP link can connect communication networks from the same internet service provider, such as a link connecting Verizon LTE wireless network with the Verizon Fire network.

The first appliance 150, along with any other appliances in system 100 can be physical or virtual. In the exemplary embodiment of a virtual appliance, it can be in a virtual private cloud (VPC), managed by a cloud service provider, such as Amazon Web Services, or others. An appliance in a customer data center can be physical or virtual. Similarly, the second location 120 may be a cloud service such as Amazon Web Service, Salesforce, or others.

As discussed herein, the communication networks 130A-130D can comprise multiple provider links, made up of routers and switches, connecting networked devices in different locations. These provider links, which together form various paths, are part of one or more core networks, sometimes referred to as an underlay network. In addition to these paths, there can also be tunnels connecting two networked devices. A virtual network, sometimes called an overlay network, can be used to transmit data across an underlay network, regardless of which Service Provider manages the routes or provider links. Data from connected devices can travel over this overlay network, which can consist of any number of tunnels or paths between each location.

In an exemplary embodiment, data from computers 140 at first location 110 may include voice, video, and data. This information can be transmitted by first appliance 150 over one or more communication networks 130A-130D to second location 120. In some embodiments, voice, video, and data may be received and transmitted on separate LAN or vLAN interfaces, and first appliance 150 can distinguish the traffic based on the LAN/vLAN interface at which the data was received.

In some embodiments, the system 100 includes one or more secure tunnels between the first appliance 150 and servers 170, or optionally a second appliance at the second location. The secure tunnel may be utilized with encryption (e.g., IPsec), access control lists (ACLs), compression (such as header and payload compression), fragmentation/coalescing optimizations, and/or error detection and correction provided by an appliance.

In various embodiments, first location 110 and/or second location 120 can be a branch location, central location, private cloud network, data center, or any other type of location. In addition, multiple locations can be in communication with each other. As understood by persons of ordinary skill in the art, any type of network topology may be used.

The principles discussed herein are equally applicable to multiple first locations (not shown) and to multiple second locations (not shown). For example, the system 100 may include multiple branch locations and/or multiple central locations coupled to one or more communication networks. System 100 may also include many sites (first locations) in communication with many different public web services (second locations). Branch location/branch location communication, central location/central location communication, central location/cloud appliance communication, as well as multi-appliance and/or multi-node communication and bi-directional communication are further within the scope of the disclosure. However, for the sake of simplicity, FIG. 1 illustrates the system 100 having a single first location 110 and a single second location 120.

Figure 2:
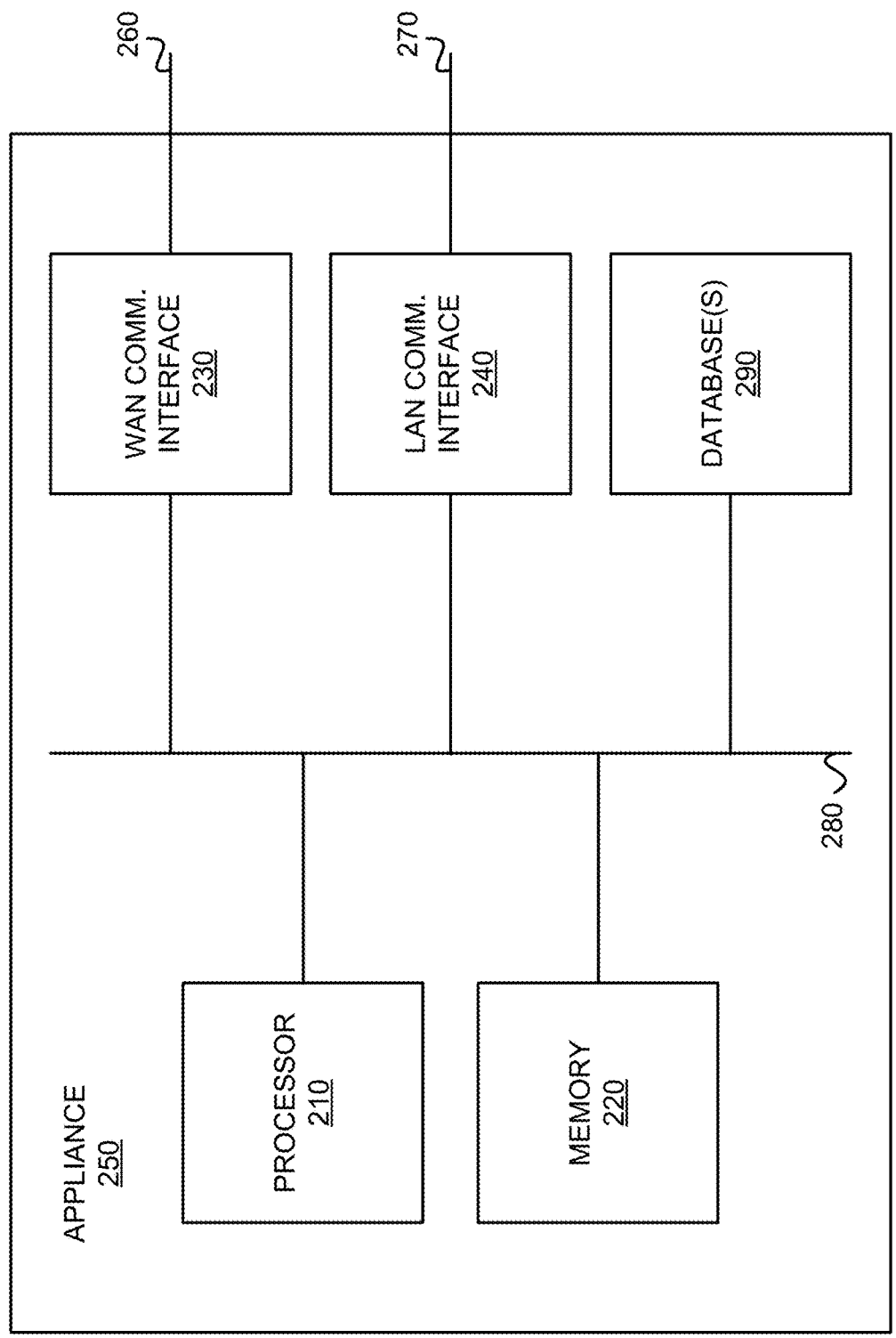
FIG. 2 illustrates a block diagram of an exemplary appliance.

FIG. 2 illustrates a block diagram of an appliance 250 (also referred to herein as a network appliance), in an exemplary implementation of the invention. Appliance 250 may be similar to first appliance 150 of FIG. 1, as discussed herein. The appliance 250 includes a processor 210, a memory 220, a WAN communication interface 230, a LAN communication interface 240, and database(s) 290. A system bus 280 links the processor 210, the memory 220, the WAN communication interface 230, the LAN communication interface 240, and the database(s) 290. When deployed in a branch location, line 260 links the WAN communication interface 230 to the router 160 (in FIG. 1), and line 270 links the LAN communication interface 240 to the computers 140 in FIG. 1.

The database(s) 290 comprises hardware and/or software elements configured to store data in an organized format to allow the processor 210 to create, modify, and retrieve the data. The hardware and/or software elements of the database(s) 290 may include storage devices, such as RAM, hard drives, optical drives, flash memory, and magnetic tape.

In some embodiments, some appliances comprise identical hardware and/or software elements. Alternatively, in other embodiments, some appliances, such as a second appliance, may include hardware and/or software elements providing additional or specialized processing, communication, and storage capacity.

Embodiments of the present invention also allow for centrally assigned policies to be implemented throughout an organization's entire network, to secure and control all WAN traffic for the organization. Software defined WAN (SD-WAN) overlay networks can be created independently from the physical network, and from each other, and in multiple layers. Topology, security, and forwarding rules can be specified independently for each overlay. This design allows for high-scale and secure application segmentation. Each overlay scales automatically as endpoints are added to the SD-WAN fabric, and configuration integrity is maintained as each site maps a local profile into a global overlay.

Figure 3:
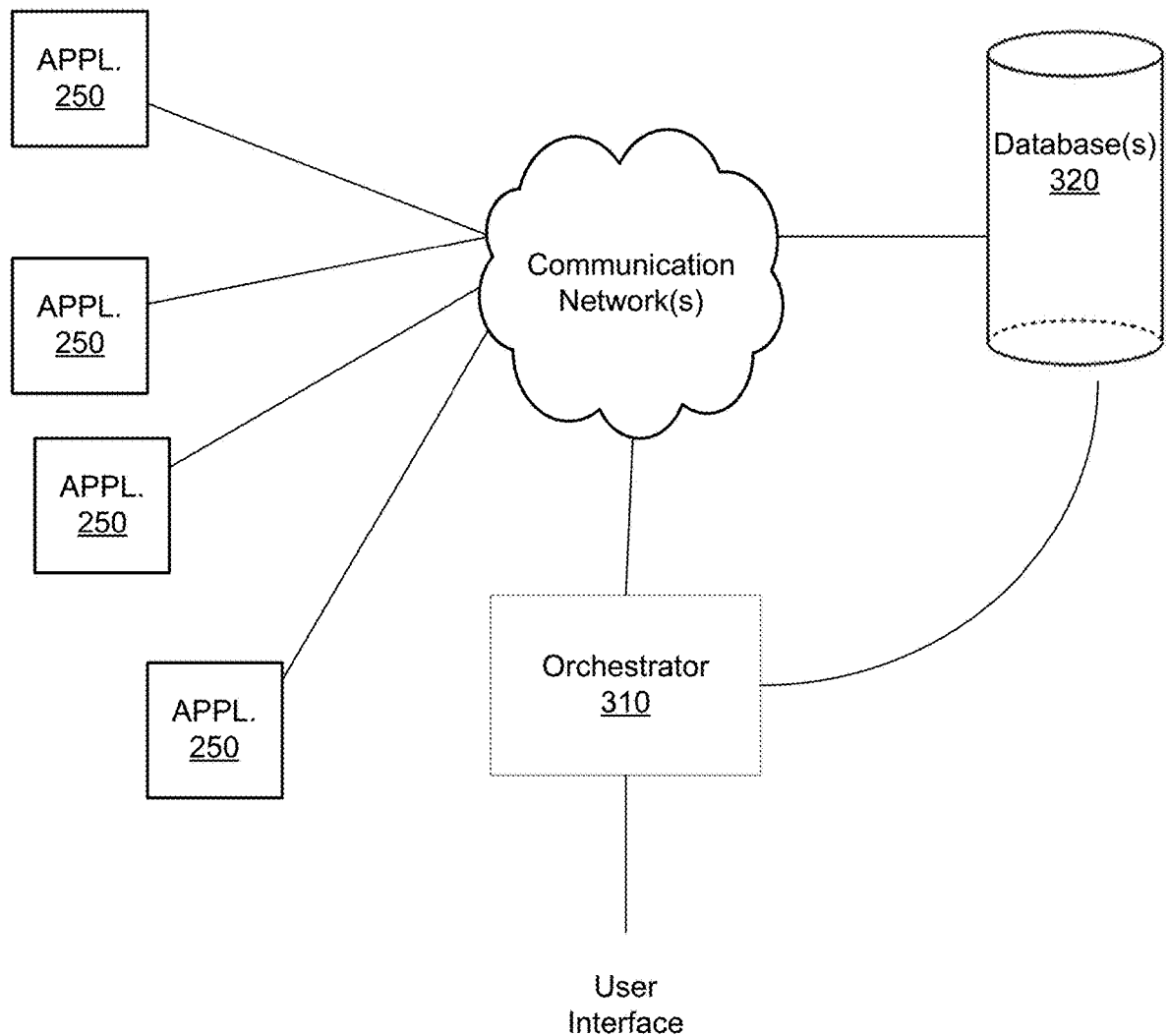
FIG. 3 illustrates an exemplary environment for network appliances.

All of the overlay networks, labels, and corresponding ports, subnets and vLANs can be maintained in one or more databases in communication with an orchestrator device, as depicted in FIG. 3. The orchestrator 310 can be hardware and/or software, and be in communication with each of the networked devices, such as the network appliances, as well as in communication with the database(s) 320.

In exemplary embodiments, the orchestrator 310 may maintain information regarding the configuration of each appliance at each location (physical or virtual). In this way, the orchestrator 310 can create, manage and implement policies for network traffic throughout the network of connected appliances. For example, if a higher priority is designated for voice traffic, the orchestrator 310 can automatically configure the corresponding network appliances at all relevant locations accordingly.

By having knowledge of the configuration of each appliance in the network, the orchestrator 310 can also create and manage tunnels in the enterprise network, including tunnels to carry a particular type of network traffic between each source-destination appliance pair. The orchestrator 310 can automatically configure the enterprise network by determining which tunnels need to be set up, and automatically creating them based on the network nodes and overlays. The orchestrator 310 can also configure policies based on the application classification techniques to preferentially steer certain types of applications over one path rather than over another path.

In exemplary embodiments, network interfaces of a network appliance 250 can be designated on the WAN side and LAN side as processing a specific type of traffic, or traffic from specific applications. For example, a first WAN interface may connect to the public Internet, while a second WAN interface connects to an MPLS service. Both WAN interfaces can support encryption and the Internet uplink can be configured for Network Address Translation (NAT).

As discussed herein, there are many flavors of multicast data traffic, such as application based and IP based. In application based multicast, the applications do the heavy lifting of membership and group management. With an IP based solution, membership and group management are handled by multicast-enabled routers. PIM-SM, PIM-DM, etc. are some of the available options to IP based multicast. However, PIM alone can't work with end hosts, so IGMP can also be utilized in combination to manage multicast forwarding at an end host layer. In embodiments of the present invention, a network appliance supports PIM-SM and IGMP with the help of meta-switch software. Both protocols code are run as a separate process in the appliance called mrtrd (multicast-router-daemon).

MRTRD is a PIM managed process. It is fully integrated with TMS library for reading/writing configuration bindings. In exemplary embodiments, MRTRD has two components (threads): TMS-library and meta-switch library. TMS-library is run in a separate thread that is responsible for reading the initial configuration reading from the database. It receives configuration commands from CLI/GUI and transforms them into a format known to the meta-switch library and queues it in CMDQ. Periodically, TMS-library thread will monitor CMDQ if commands are available for submitting to meta-switch thread. After submitting a command, it will mark meta-switch thread as BUSY. Typically, only meta-switch thread can un-set a BUSY flag.

Meta-switch library is the main thread that has meta-switch software. It does the initial setup to run PIM and IGMP protocol code. Main thread/meta-switch thread is responsible for running PIM/IGMP protocols. It also reads configuration from a kernel about interface/vLANs and initial set of routers.

Both TMS-library thread and meta-switch library thread can share two queues to accomplish the required functionality in a network appliance. In exemplary embodiments, the shared two queues are CMDQ and NHOPQ. Each of these two queues can be periodically checked to see if any commands need to be processed. Commands from CMDQ can be submitted to meta-switch library by the TMS-library thread. Commands from NHOPQ can be converted into a request binding and TUNLD can respond to them. NHOPQ is used to get unicast routes from TUNLD which are needed for PIM protocol to run. For example, a route to source is needed to do SPT-switch (shortest path switch to source), which can be configured to be a default on a network appliance of the present invention.

In exemplary embodiments, mrtrd operating in an appliance is a process responsible for sending, receiving, and processing of PIM/IGMP control packets. Control packets are received by mrtrd via multicast enabled sockets created by meta-switch software. Further, mrtrd can configure a kernel to create multicast routes based on PIM control packets. Once the required state is programmed in the kernel by mrtrd, data can be forwarded by the kernel alone. In various embodiments, SPT-switch over can be initiated by mrtrd, and mrtrd will program the kernel to create a multicast route with <IIF, OILs> (<incoming interface, outgoing interface list>) per group. The kernel's multicast route can later be torn down gracefully by mrtrd once it stops receiving PIM control packets. In this way, multicast routes can be added and removed in a scalable and secure manner.

In various embodiments, Unicast RTM is also stored in meta-switch. A required route for mrtrd can be fetched from TUNLD. Further, multicast data can be forwarded as pass through unshaped by quality of service constraints, in exemplary embodiments.

Embodiments of the present disclosure can be implemented via a physical or virtual network appliance with at least two standard interfaces (vLAN or Native) on different subnets. The interfaces can be LAN or WAN interfaces. The network appliance can be configured in a number of different ways, such as a Rendezvous Point (RP) for multicast traffic, an appliance in communication with an external RP, a FHR (First Hop Router) directly connected to a streaming source, a LHR (Last Hop Router) due to IGMP support which is directly connected to end hosts, a MHR (Middle Hop Router) between an RP and LHR. In exemplary embodiments, the RP or Source of the multicast traffic is reachable on a standard interface and not merely via a network overlay. There may be only one RP address in an enterprise network for all multicast groups, or a plurality of RP addresses in an enterprise network. In exemplary embodiments, the RP may be configured by a network administrator or automatically.

I. Transfer of Multicast Data

Exemplary Use Case

In an exemplary use case, one customer data site has data to transmit to hundreds or even thousands of end computing devices in disparate locations. For example, an enterprise may wish to broadcast a video message to its many branch locations, an enterprise may wish to send a stock ticker price to multiple bank sites across the country, or an enterprise may wish to play music to customers that are placed on hold across the world. Previously, this type of multicast network traffic could only be transmitted over an expensive private MPLS network. One or more Internet Service Providers (ISPs) stitched together a network hop by hop and charged the enterprise for use of the network.

In embodiments of the present disclosure, SD-WAN can be utilized to seamlessly meld together private and public communication networks, so that the SD-WAN provider can carry the multicast traffic over the Internet without the use of any ISPs. Public communication networks today typically create point to point links, to stitch together a network manually over IPSec to make it seem like a private network to an end user. With the use of an SD-WAN fabric, each individual router and network does not need to be manually configured to carry network traffic. Rather, an end user simply transmits to an edge router of the SD-WAN fabric and does not need to worry about the intermediate hops to the destination computer. In this way, a source can transmit multicast traffic over a public Internet (and not have to rely on an expensive ISP connection) in a scalable, secure, seamless, and deployment free manner. Destination sites can be added or removed to the SD-WAN fabric, without any change necessary from the source side or the destination side of the multicast network traffic.

Figure 4:
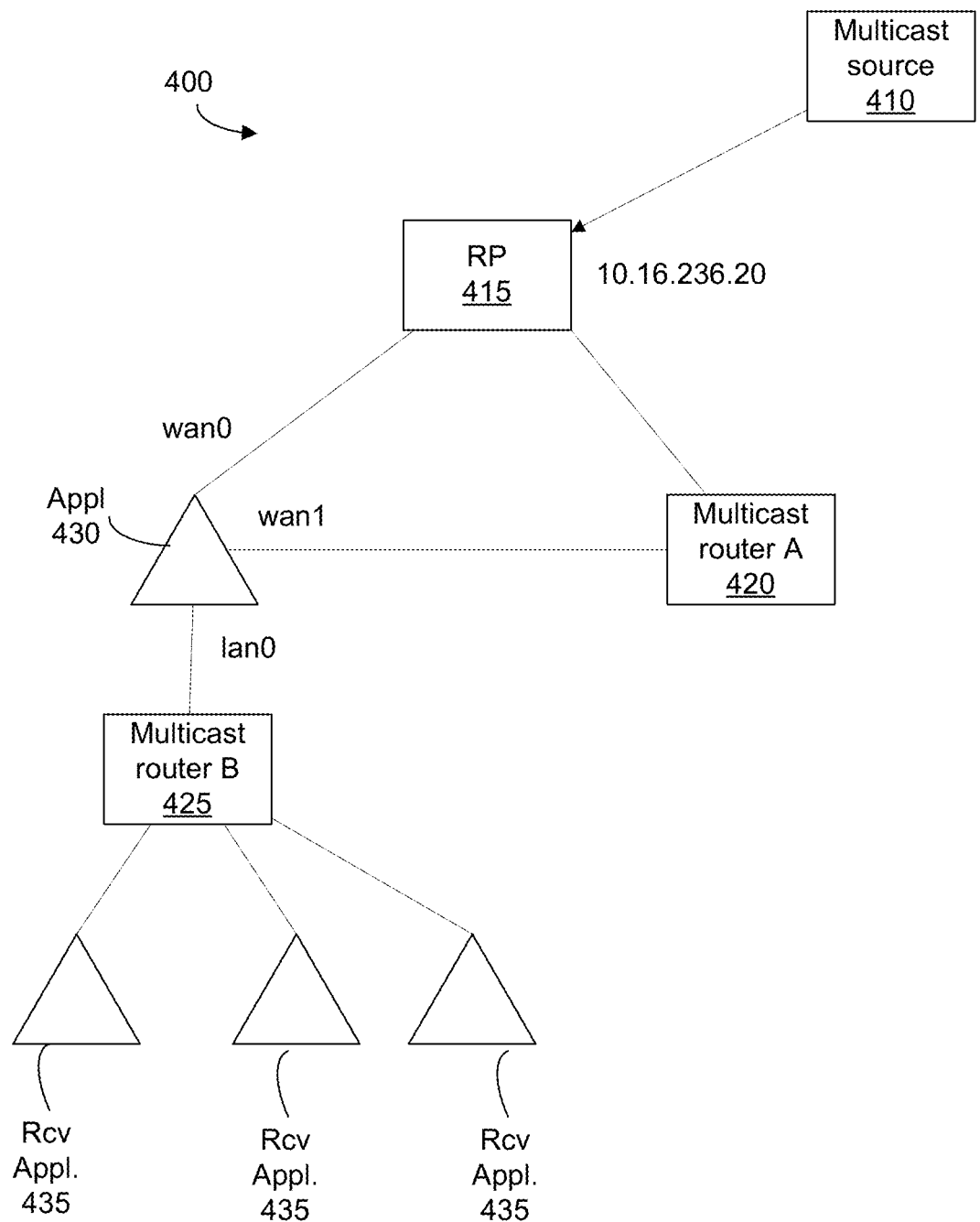
FIG. 4 depicts an exemplary environment within which the present disclosure may be implemented.

In exemplary environment 400 of FIG. 4, multicast source 410 has multicast data to transmit. Multicast source 410 may send a ping to a known multicast group IP address of 224.8.8.8. The designated RP for the network may have an IP address of 10.16.236.20. The multicast data traffic may be sent by the RP 415 directly to appliance 430, or to multicast router A 420, and then on to appliance 430. Appliance 430 may have the same configuration as appliance 250 discussed herein.

Appliance 430 may further be configured with 3 deployed interfaces, named wan0, wan1, and lan0. Appliance 430 may first be configured to enable PIM on each of the 3 interfaces. Each time PIM is enabled on an interface, PIM assigns a random 64 bit value to it. On each subnet, PIM identifies a designated router, which is responsible PIM control data. Neighboring computing devices for each of the 3 interfaces can also be determined. Optionally, IGMP may be enabled on appliance 430. If appliance 430 has end hosts on either the LAN side or the WAN side, then IGMP may be enabled.

After enablement, a path to the RP 415 through environment 400 is determined by appliance 430, after it is created in mrtrd. Further, appliance 430 can check that the nexthops on the interfaces are reachable, otherwise PIM neighbors may not be detected by multicast router. If the nexthops on the interfaces are not reachable, then the IP address of RP 415 can be changed.

In the exemplary FIG. 4, multicast source 410 may transmit multicast data for transmission to RP 415. In turn, RP 415 transmits the data to appliance 430, which in turn transmits the data to multicast router B 425. Multicast router B 425 in turn triplicates the data and transmits to each of the 3 receiving appliances 435. As would be understood by persons of ordinary skill in the art, there can be any number of receiving appliances and three are depicted in the figure for illustrative purposes only.

Exemplary Deployment Scenario

Figure 5:
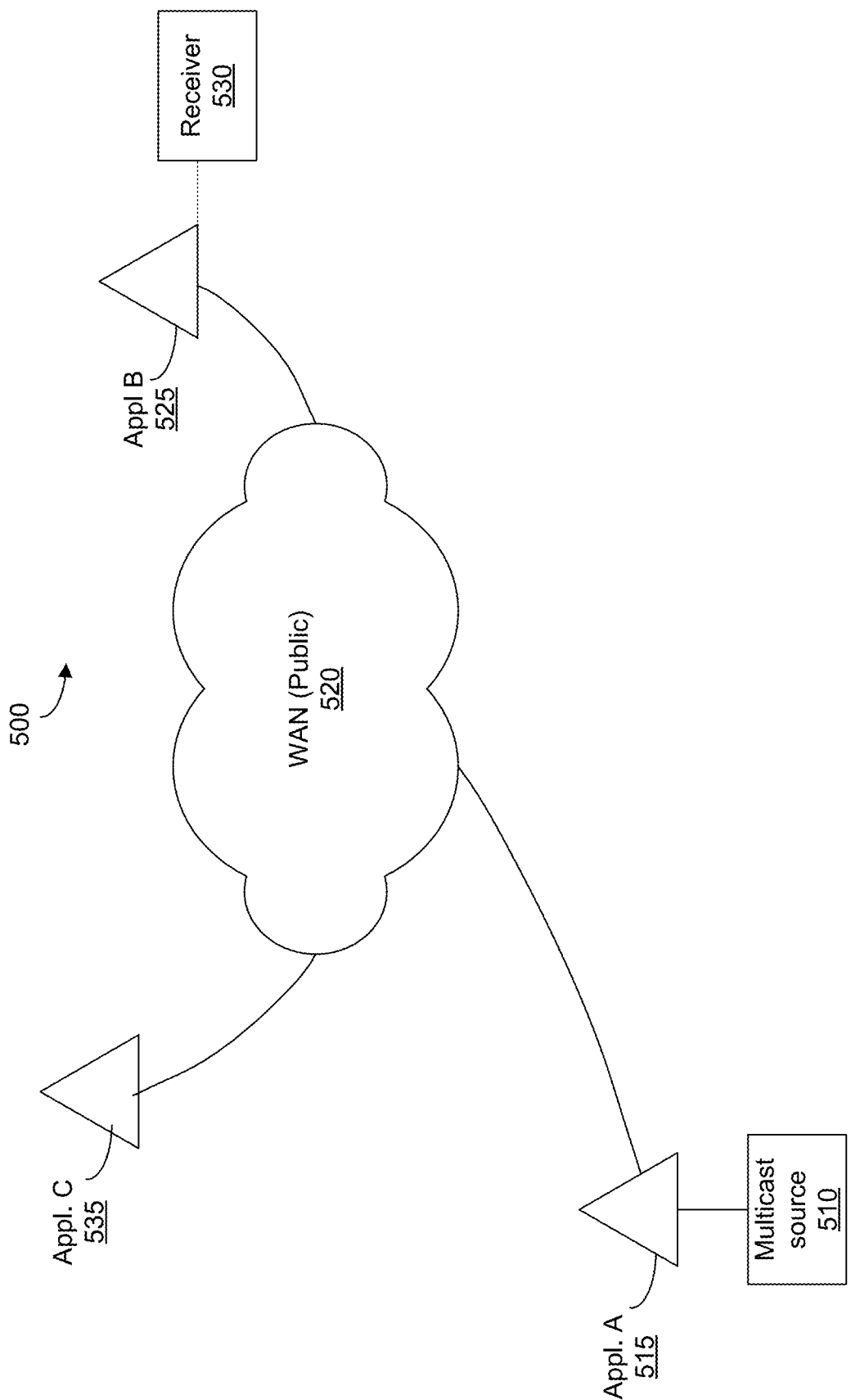
FIG. 5 depicts another exemplary environment within which the present disclosure may be implemented.

FIG. 5 depicts an exemplary deployment scenario with three appliances 515, 525, 535 connected via a public WAN in different physical locations. Each of the three appliances may be located in different cities around the world. Because they are connected by public WAN, the network connection between them is inherently insecure. They may be connected in any network configuration, which may or may not be a full mesh configuration. Further, the appliances may be part of a centralized data center or a branch center. Each appliance may or may not have a private network connection as well. Further, each appliance may be connected to an orchestrator (such as orchestrator 310 of FIG. 3), even though not depicted in the exemplary environment 500 of FIG. 5. As discussed herein, the orchestrator has a global view of the whole network across the geographical area, and all of the configurations and deployment can occur at the orchestrator itself.

In order to transmit multicast data, first a secure interface channel is created between the different sites (also referred to herein as an overlay network). A virtual interface is overlaid on the overlay network. In this way, data can be transmitted in a secure manner over the inherently insecure public WAN network. In exemplary embodiments, multicast source 510 is ignorant of the creation or setup of the overlay network connecting the appliances 515, 525, 535. Appliance A 515 connected to multicast source 510 simply appears to multicast source 510 to be a regular router. Similarly, multicast receiver 530 is ignorant of the creation or setup of the overlay network connecting the appliances, as appliance B 525 connected to multicast receiver 530 simply appears to it to be a regular router.

While only three appliances are depicted in exemplary FIG. 5, there can be any thousands of sites and overlays in a given enterprise network. However, these are hidden and the whole fabric is encapsulated into a single virtual interface that is exposed to the control PIM modules. In this way, multicast source and multicast receiver can exchange messages with an appliance and create a state with the appliances without needing to know or understand the complex overlay network connecting the appliances. The orchestrator connecting the appliances can create the thousands of overlays with the click of a button.

With this setup, multicast source 510 may transmit multicast data as a single stream of packets, which is then split across all of the relevant sites seamlessly without a user having to do anything. The orchestrator may setup which of the appliances are participants in the multicast network, and use the PIM-SM protocol to create forwarding states as to which overlays to send the data over. This information is computed by PIM-SM protocol running in the appliance A 515 connected to multicast source 510.

In exemplary embodiments, multicast source 510 transmits data and decides which multicasts receivers can receive the data. The orchestrator decides how the various devices are connected through the network. With this setup, there is no need to send data all the way to a site (appliance) where no multicast receiver is connected. Thus, appliance 515 does not need to duplicate the data to all connected appliances. The receiving device information can be dynamically adjusted.

In an exemplary method, a user at receiver 530 may open an application to listen to an enterprise-wide video broadcast. Receiver 530 advertises to the network that it is there is to receive the traffic via sending PIM-SM information. This gets transmitted through the network to multicast source 510, which then adds receiver 530 to the network for receiving the multicast data. A tree of network paths is created from multicast source 510 to any and all receivers 530 that may be present in environment 500, as discussed herein. The tree branches are dynamic as additional receivers can be added at any time and receivers may be dropped at any time. While prior systems built this tree on private networks by service providers, the present disclosure allows for the multicast tree paths to be built using proprietary overlay networks over a public network. The overlay network can transform itself into a multicast tree to provide similar functionality to what an ISP can provide over a private network.

While FIG. 5 depicts only one multicast source and one multicast receiver, there can be any number of multicast sources and multicast receivers in environment 500. For example, there can be a video streaming application, a music streaming application, a stock ticker, etc. Different applications broadcasting to different sets of client computing devices simultaneously, each set segregated by different group identification numbers. These multiple multicast channels may be broadcasting in isolation and in parallel in the network.

As discussed herein, receiver 530 may inform appliance B 525 that it wishes to join a multicast transmission by transmitting an IGMP-join message to appliance B 525 through a multicast application. One appliance in the network is designated as the Rendezvous Point for that multicast traffic, by the orchestrator connecting all of the appliances. Each appliance is configured to transmit any such IGMP-join messages to the respective Rendezvous Point, via the overlay network overlay network 520.

Appliance B 525, as a configuration step in the orchestrator, is configured to know that the IGMP-join message is to be transmitted to the appliance designated as the RP for the requested multicast channel, and transmits the message to the IP address of the RP via the overlay network.

Since the protocol is built to understand IP addresses and interfaces (links), not the traditional underlay/overlay network structure, one single virtual link representing the SD-WAN fabric (composed of all of the overlays) is represented to appliance B 525. Otherwise, thousands of interfaces (one for each ovelay) may be present in the environment. Thus, the entire network complexity is hidden and only one neighbor/peer is visible to receiver 530. PIM-SM knows that the RP is reachable via the virtual link. Thus, appliance 525 receives the IGMP-join message from receiver 530, transmits a PIM-join message to the designated RP such that it also receives any packets for the designated multicast IP channel. When appliance B 525 receives the multicast traffic from the RP, since multicast packets are not supported by public networks, appliance B 525 encapsulates the data in a virtual overlay packet and transmits to receiver 530.

While not expressly depicted for simplicity, there can be any number of other routers or other computers in environment 500 than those shown in FIG. 5. With the present invention, replication is provided over the SD-WAN fabric in a scalable and secure way. The replication can be on either the WAN side of an appliance, LAN side of an appliance, or both. When receiver 530 no longer wishes to receive the multicast traffic, it transmits an IGMP message to end receipt of the transmission and preserve network bandwidth.

Thus, methods and systems for the transfer of secure multicast data traffic over a computing network are disclosed. Although embodiments have been described with reference to specific examples, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A method for transmitting multicast data over a public communication network by a first network appliance, the method comprising:
    receiving at the first network appliance, designated as a rendezvous point for a multicast data transmission, a request from a second network appliance to receive the multicast data transmission;
    determining that the second network appliance receives the multicast data transmission based on a multicast-compliant routing protocol associated with the request;
    transmitting the multicast data transmission from a transmitting computing device to a virtual interface of the first network appliance;
    encapsulating the multicast data transmission by the first network appliance into a virtual network overlay transmission;
    transmitting the virtual network overlay transmission from the first network appliance over the public communication network to the second network appliance; and
    transmitting the multicast data transmission by the second network appliance to a receiving computing device.

2. The method of claim 1, wherein the second network appliance further duplicates the multicast data transmission and transmits to a plurality of receiving computing devices.

3. The method of claim 1, wherein the receiving computing device requests to receive the multicast data transmission via an IGMP join message.

4. The method of claim 1, wherein the second network appliance requests to receive the multicast data transmission from the first network appliance via a PIM-SM message.

5. The method of claim 1, wherein the first network appliance and the second network appliance are connected via a virtual overlay network overlaying the public communication network.

6. The method of claim 1, wherein the first network appliance and the second network appliance are in communication with an orchestrator device over a virtual overlay network overlaying the public communication network.

7. The method of claim 6, wherein the orchestrator device is further configured to create one or more virtual paths in the virtual overlay network automatically.

8. The method of claim 1, wherein the first network appliance and the second network appliance are located in disparate geographical locations.

9. A first network appliance, comprising:
    a processor; and
    a memory operatively connected to the processor, and including instructions that when executed, cause the processor to:
        receive at the first network appliance, designated as a rendezvous point for a multicast data transmission, a request from a second network appliance to receive the multicast data transmission;
        determine that the second network appliance receives the multicast data transmission based on a multicast-compliant routing protocol associated with the request;
        transmit the multicast data transmission from a transmitting computing device to a virtual interface of the first network appliance;
        encapsulate the multicast data transmission by the first network appliance into a virtual network overlay transmission;
        transmit the virtual network overlay transmission from the first network appliance over the public communication network to the second network appliance; and
        transmit the multicast data transmission by the second network appliance to a receiving computing device.

10. The first network appliance of claim 9, wherein the second network appliance further duplicates the multicast data transmission and transmits to a plurality of receiving computing devices.

11. The first network appliance of claim 9, wherein the receiving computing device requests to receive the multicast data transmission via an IGMP join message.

12. The first network appliance of claim 9, wherein the second network appliance requests to receive the multicast data transmission from the first network appliance via a PIM-SM message.

13. The first network appliance of claim 9, wherein the first network appliance and the second network appliance are connected via a virtual overlay network overlaying the public communication network.

14. The first network appliance of claim 9, wherein the first network appliance and the second network appliance are in communication with an orchestrator device over a virtual overlay network overlaying the public communication network.

15. The first network appliance of claim 14, wherein the orchestrator device is further configured to create one or more virtual paths in the virtual overlay network automatically.

16. The first network appliance of claim 9, wherein the first network appliance and the second network appliance are located in disparate geographical locations.

17. A network appliance, comprising:
a memory; and
one or more processors configured that are configured to execute machine readable instructions stored in the memory to:
receive at the network appliance, designated as a rendezvous point for a multicast data transmission, a request from another network appliance to receive the multicast data transmission;
determine that the second network appliance receives the multicast data transmission based on a multicast-compliant routing protocol associated with the request;
transmit the multicast data transmission from a transmitting computing device to a virtual interface of the network appliance;
encapsulate the multicast data transmission by the network appliance into a virtual network overlay transmission;
transmit the virtual network overlay transmission from the network appliance over a public communication network to the other network appliance; and
transmit the multicast data transmission by the other network appliance to a receiving computing device.

18. The network appliance of claim 17, wherein the network appliance and the other network appliance are connected via a virtual overlay network overlaying the public communication network.

19. The network appliance of claim 17, wherein the network appliance and the network appliance are in communication with an orchestrator device over a virtual overlay network overlaying the public communication network.

20. The network appliance of claim 17, wherein the first network appliance and the other network appliance are located in disparate geographical locations.

* * * * *